United States Patent
Komiya et al.

(10) Patent No.: US 8,678,384 B2
(45) Date of Patent: Mar. 25, 2014

(54) MEDIUM TRANSPORT UNIT, SENSOR UNIT, AND METHOD OF CONTROLLING READING OF MEDIUM TRANSPORT UNIT

(75) Inventors: Kenichi Komiya, Kanagawa-ken (JP); Koji Tanimoto, Shizuoka-ken (JP); Daisuke Ishikawa, Shizuoka-ken (JP); Hiroyuki Ishikawa, Shizuoka-ken (JP); Kazutoshi Takahashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 350 days.

(21) Appl. No.: 13/236,595

(22) Filed: Sep. 19, 2011

(65) Prior Publication Data
US 2012/0081757 A1    Apr. 5, 2012

Related U.S. Application Data

(60) Provisional application No. 61/389,708, filed on Oct. 4, 2010.

(51) Int. Cl.
*B65H 7/02* (2006.01)

(52) U.S. Cl.
USPC ............ 271/265.01; 271/265.02; 271/265.03

(58) Field of Classification Search
USPC ............ 271/265.01, 265.02, 265.03, 265.04
See application file for complete search history.

(56) References Cited

U.S. PATENT DOCUMENTS

| | | | |
|---|---|---|---|
| 6,947,088 B2 * | 9/2005 | Kochi | 348/308 |
| 7,511,862 B2 * | 3/2009 | Sano et al. | 358/474 |
| 7,609,423 B2 * | 10/2009 | Sano et al. | 358/498 |
| 8,348,270 B2 * | 1/2013 | Nishikata et al. | 271/265.03 |
| 8,355,643 B2 * | 1/2013 | Kojima et al. | 399/49 |
| 2004/0165025 A1 * | 8/2004 | Ishibashi et al. | 347/19 |
| 2005/0140704 A1 | 6/2005 | Mitsunaga et al. | |
| 2009/0072475 A1 * | 3/2009 | Sawada | 271/265.02 |
| 2009/0244647 A1 * | 10/2009 | Kawai | 358/463 |
| 2010/0309242 A1 * | 12/2010 | Chikuma et al. | 347/14 |
| 2011/0304893 A1 * | 12/2011 | Sakai | 358/513 |
| 2012/0002988 A1 * | 1/2012 | Kuramochi et al. | 399/45 |
| 2012/0139180 A1 * | 6/2012 | Ohshima et al. | 271/258.01 |
| 2013/0259510 A1 * | 10/2013 | Regelsberger et al. | 399/74 |

\* cited by examiner

*Primary Examiner* — Kaitlin Joerger
(74) *Attorney, Agent, or Firm* — Patterson & Sheridan LLP

(57) ABSTRACT

A medium transport unit includes: a transport roller; a transport belt which transports a loaded medium by driving of the transport roller; a sensor array which includes a plurality of imaging elements arranged vertically to a transport direction of the medium and outputs reading signals which are detected and output by the plurality of imaging elements and indicate a density value of the medium on the transport belt; a comparator which outputs a digitalized signal of HIGH if the reading signal exceeds a threshold signal; and a signal output circuit which receives the digitalized signal and outputs a first value if the digitalized signal is transitioned from LOW to HIGH.

20 Claims, 6 Drawing Sheets

MEDIUM TRANSPORT UNIT, SENSOR UNIT, AND METHOD OF CONTROLLING READING OF MEDIUM TRANSPORT UNIT

CROSS-REFERENCE TO RELATED APPLICATIONS

This application is based upon and claims the benefit of priority from: U.S. provisional application 61/389,708, filed on Oct. 4, 2010; the entire contents all of which are incorporated herein by reference.

FIELD

Embodiments described herein relate generally to a technique for detecting a medium.

BACKGROUND

A sensor unit such as a contact image sensor (hereinafter, referred to as CIS) used in an image forming apparatus includes a sensor array in which a plurality of sensors are arranged in parallel in a reading scanning direction (main scanning direction) and is mounted on a transport unit so as to detect transporting a sheet.

In the related art, the plurality of sensors in the sensor array output a reading signal (signal of a density value) of the sheet in the corresponding sensor in synchronization with each reference clock sequentially input to each sensor. Further, the sensors detect a front end and a rear end of the sheet based on the reading signal.

The reading signal output from each sensor, which is an analog signal, is subjected to A/D conversion so as to be converted into a digital signal and is transmitted to an upper level controller or an image processing unit in synchronization with the reference clock. The sensor unit according to the related art detects the front end and the rear end of the sheet by receiving the digital signal subjected to the A/D conversion. However, when a delay time occurs due to the A/D conversion, the sensor unit may not accurately detect the front end and the rear end of the sheet.

DETAILED DESCRIPTION

A medium transport unit according to an exemplary embodiment includes: a transport roller; a transport belt which transports a loaded medium by driving of the transport roller; a sensor array which includes a plurality of imaging elements arranged vertically to a transport direction of the medium and outputs a reading signal which is detected and output by each of the plurality of imaging elements and indicate a density value of the medium on the transport belt; a comparator which receives the reading signal output from the sensor array and outputs a digitalized signal of HIGH if the reading signal exceeds an input threshold signal; and a signal output circuit which receives the digitalized signal output from the comparator and outputs a first value if the digitalized signal is transitioned from LOW to HIGH.

Figure 1:
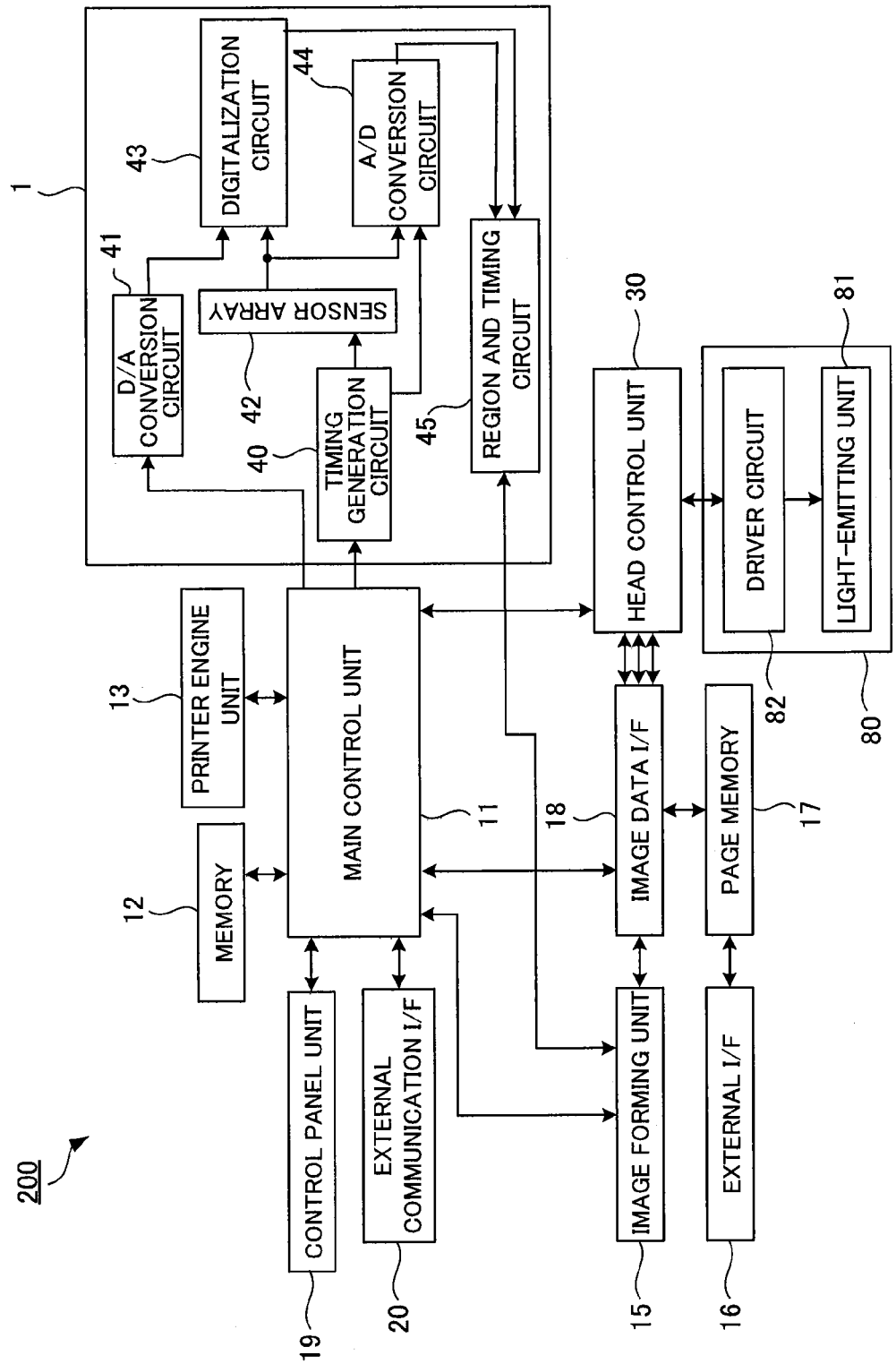
FIG. 1 is a block diagram illustrating an example of the configuration of an image forming apparatus according to an exemplary embodiment.

FIG. 1 is a system block diagram illustrating an example of the configuration of an image forming apparatus 200 according to an exemplary embodiment. An operation or each block of the image forming apparatus 200 will be described with reference to FIG. 1.

Image data generated by an external apparatus such as a personal computer is received by an external I/F 16 and is stored in a page memory 17. The image data stored in the page memory 17 is subjected to image processing such as a gray scale process or an edge detection process by an image processing unit 15 via an image data I/F 18 and is stored again in the page memory 17.

When a current job is to be transmitted to the outside by, for example, FAX, a main control unit 11 acquires the image data stored in the page memory 17 via the image data I/F 18 and outputs the image data to an external communication I/F 20. The image data is transmitted to the outside through this process.

When the current job is to be subjected to a process of forming an image on a sheet, the image is formed on the sheet by a printer engine unit 13 including a photoconductive drum or a charging roller and a print head 80 including a driver circuit 82 and a light-emitting unit 81. A head control unit 30 controls a toner output of the print head 80. A solid head such as an LED head or an organic EL head is used as the print head 80.

The image forming apparatus 200 includes a control panel unit 19 which receives an instruction from a user and displays a status of the image forming apparatus 200 or a progress status of a job to the user.

The image forming apparatus 200 includes a sensor unit 1 which detects whether the sheet is transported by acquiring a density value on the sheet and detecting a front end and a rear end of the sheet. The sensor unit 1 includes a timing generation circuit 40, a D/A conversion circuit 41, a sensor array 42, a digitalization circuit 43, an A/D conversion circuit 44, and a region and timing circuit 45.

The timing generation circuit 40 generates a conversion clock serving as a reference clock in the sensor unit 1 based on an instruction from the main control unit 11 and outputs a timing signal to the A/D conversion circuit 44. The timing generation circuit 40 outputs a start signal to the sensor array 42.

The sensor array 42 has a configuration in which a plurality of sensors (imaging elements) are vertically arranged to the transport direction of the sheet. The sensor array 42 outputs a reading signal detected by each sensor to the digitalization circuit 43 and the A/D conversion circuit 44. The reading signal is a signal which indicates the density value of the sheet to be transported and is an analog signal. The sensor array 42 is a CCD image sensor or a CMOS image sensor. A photoelectric conversion element of the sensor array 42 is a photo diode. That is, light of the image formed on the sensor array 42 is converted into a current by the photo diode, is converted into a voltage via a resistor or the like, and is output as a sensor output.

The D/A conversion circuit 41 inputs a threshold signal (digital signal) output from the main control unit 11, converts the threshold signal into an analog signal, and outputs the converted analog signal to the digitalization circuit 43.

The digitalization circuit 43 inputs the reading signal from the sensor array 42. The digitalization circuit 43 inputs the threshold signal from the D/A conversion circuit 41. The digitalization circuit 43 outputs, to the region and timing circuit 45, a digitalized signal, which becomes HIGH when a value of the reading signal exceeds the threshold signal and becomes LOW when the value of the reading signal is less than (or equal to) the threshold signal.

The A/D conversion circuit 44 inputs the reading signal from the sensor array 42, converts the reading signal into the digital signal, and outputs the converted digital signal to the region and timing circuit 45.

The region and timing circuit 45 is a circuit which outputs a signal of a timing at which an external unit of the sensor unit 1, such as the image processing unit 15, the printer engine unit 13, or the head control unit 30 performs processing or which outputs data regarding each density value detected by the sensor array 42. The region and timing circuit 45 transmits an image area signal or an image formation timing signal to the outside of the sensor unit 1 based on the input signal. In this exemplary embodiment, the timing signal is transmitted based on the digitalized signal from the digitalization circuit 43.

Each unit of the image forming apparatus 200 is generally controlled by the main control unit 11 which is, for example, a CPU (Central Processing Unit) or an MPU (Micro-Processing Unit). The software control is performed through arithmetic execution of a program loaded in advance in a memory 12, which is a storage device, by the main control unit 11. The memory 12 is configured by a RAM (Random Access Memory), a ROM (Read Only Memory), a hard disc drive, or the like and stores a program or various kinds of data.

Figure 2A:
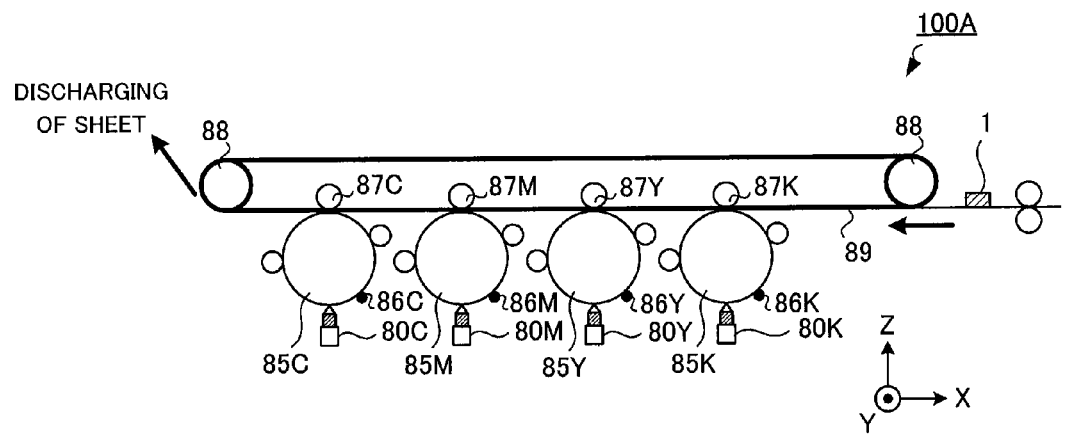
FIGS. 2A and 2B are diagrams illustrating an example of the configuration of a medium transport unit according to the exemplary embodiment.
Figure 2B:
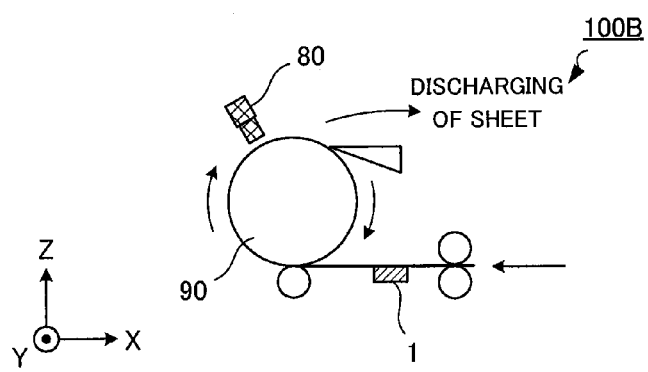

FIGS. 2A and 2B are diagrams illustrating an example of a medium transport unit including each unit in the sensor unit 1, the print head 80, and the printer engine unit 13.

An example of the medium transport unit is first illustrated in FIG. 2A. In a medium transport unit 100A, the sensor unit 1 is disposed on the upstream side and a sheet transported by a sheet feeding roller or an aligning roller (not shown) is detected using the sensor unit 1. The medium transport unit 100A transports the sheet on a transport belt 89 in a direction indicated by an arrow by driving transport rollers 88. The medium transport unit 100A includes photoconductive drums 85 (85C to 85K), charging rollers 86 (86C to 86K), the print heads 80 (80C to 80K), transfer members 87 (87C to 87K) for respective C (cyan), M (magenta), Y (yellow), and K (black) colors. These respective units are disposed on the downstream side of the sensor unit 1. These units become effective by receiving an execution timing signal from the sensor unit 1 and each color toner is attached on the sheet.

FIG. 2B is a diagram illustrating an example of a medium transport unit when an inkjet head is used as the print head 80. In a medium transport unit 100B shown in FIG. 2B, the sensor unit 1 is also disposed on the upstream side and detects a sheet transported by a sheet feeding roller or an aligning roller. The sheet is transported in a direction indicated by an arrow and is circulated around a rotating drum 90 by the number of toner colors to be attached thereon. During the circulation, each color ink from the print head 80 is landed on the sheet. When an image is formed with each color, the sheet is transported to a unit performing the subsequent process.

Figure 3:
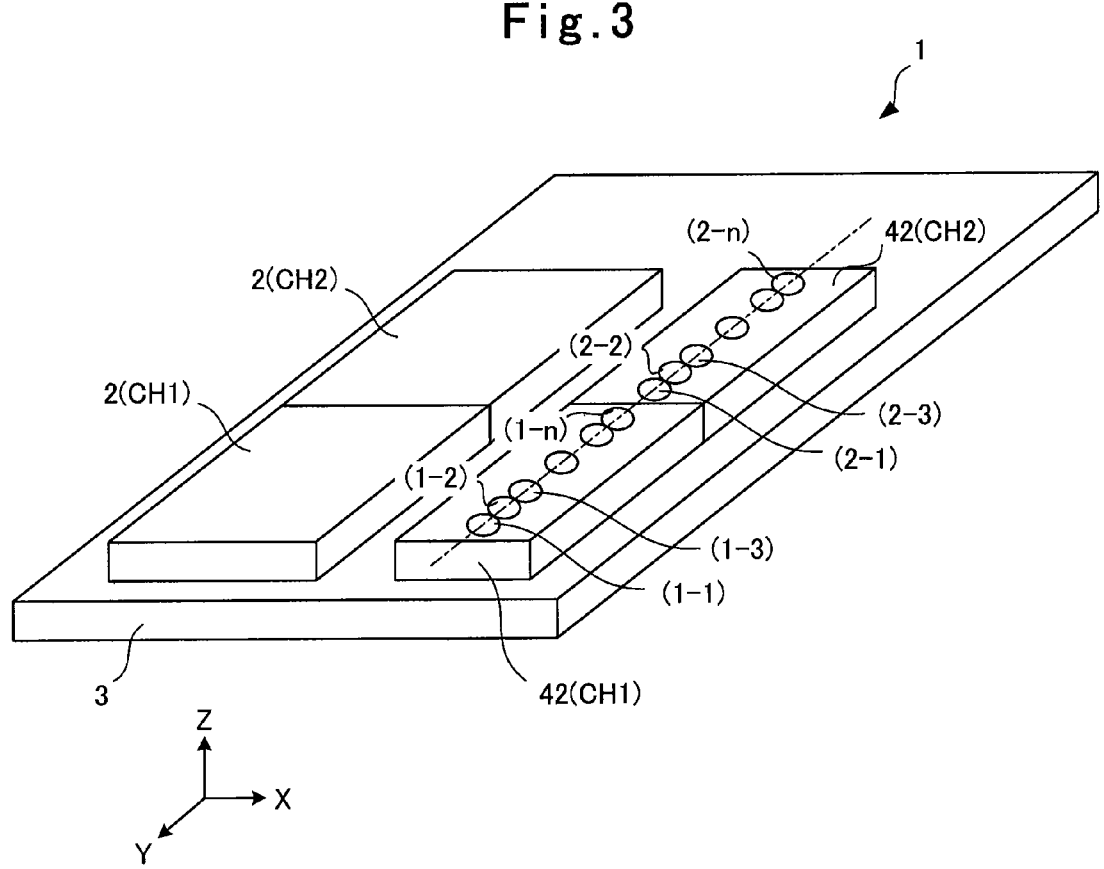
FIG. 3 is a diagram illustrating an example of the configuration of a sensor unit according to the exemplary embodiment.

FIG. 3 is a diagram illustrating an example of the configuration of the sensor unit 1. The sensor unit 1 includes the sensor array 42, circuits 2, and a substrate 3.

The respective sensors (denoted by reference numerals "1-1", "1-2", and the like) in the sensor array 42 are arranged along a straight line in a main scanning direction (Y axis direction in FIG. 3) at an interval of 600 dpi or 1200 dpi. The sensor array 42 is disposed so that an effective detection region has a short side size of A3 and is divided into a plurality of channels (in this exemplary embodiment, 6 CH) so that the number of sensors is the same. The circuit 2 is also disposed on the substrate 3 for each channel. With such a configuration, six areas divided from the short side size A3 are simultaneously subjected to the reading operation in parallel and data are output for the respective areas. Accordingly, since the reading operation is performed simultaneously for the divided six areas, high-speed reading can be performed and the transport speed of the medium transport unit 100 is made higher.

In this exemplary embodiment, the D/A conversion circuit 41, the digitalization circuit 43, and the A/D conversion circuit 44 are assembled in the circuit 2 and are disposed for each channel. The timing generation circuit 40 and the region and timing circuit 45 are assembled in the substrate 3.

Figure 4:
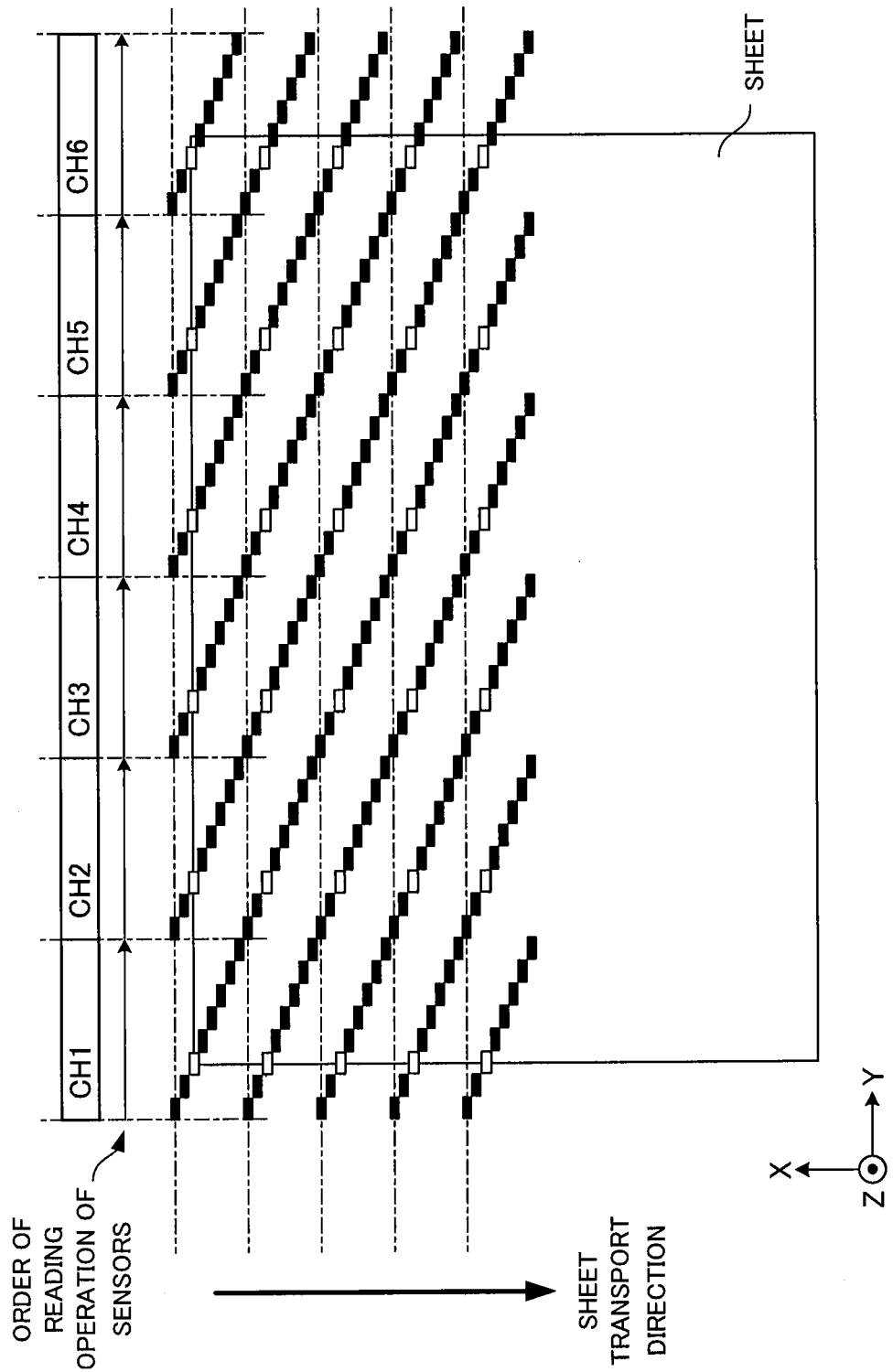
FIG. 4 is a diagram illustrating a detection operation of the sensor unit according to the exemplary embodiment.

FIG. 4 is a diagram illustrating a status where the sheet is read in the divided six areas by the sensor unit 1.

The sensors of each area (each CH) of the sensor array 42 are arranged in a straight line, as shown in FIG. 3 and start the reading operation in order from the left side of FIG. 4. When the total number of sensors of each CH is n pixels, the reading order is as follows. A notation of "X-Y" below means a Y-th sensor of a channel X (see FIG. 3) and the reading operation starts at the same timing (same clock) in each numeral of the parenthesis. When the reading operation of n-th sensors ends, the 1st sensors again start the reading operation.

(1): 1-1, 2-1, 3-1, 4-1, 5-1, 6-1
(2): 1-2, 2-2, 3-2, 4-2, 5-2, 6-2
(3): 1-3, 2-3, 3-3, 4-3, 5-3, 6-3
. . .
(n): 1-$n$, 2-$n$, 3-$n$, 4-$n$, 5-$n$, 6-$n$
(1): 1-1, 2-1, 3-1, 4-1, 5-1, 6-1
. . . .

For example, sensors (third sensor of each CH) indicated by a white void in FIG. 4 simultaneously perform the reading operation. That is, the resolution in the main scanning direction (which is a direction orthogonal to the sheet transport and a Y axis direction in FIG. 4) is a rough resolution obtained by dividing the A3 size by six, but the reading operation can be simultaneously performed for six points. Accordingly, since the reading operation can be performed on a straight line in the main scanning direction, the detection precision of the front end and the rear end of the sheet is improved. When sensor (1-3) detects a front end of a left end of the sheet in the example of FIG. 4, sensors (2-3), (3-3), (4-3), (5-3), and (6-3) also detect the front end of the sheet. Even when sheet lacking occurs in one of the six detection points, an edge of the front end of the sheet is detected by the other sensors. Therefore, the influence of disturbance (in this case, lacking) is scarcely received.

Figure 5:
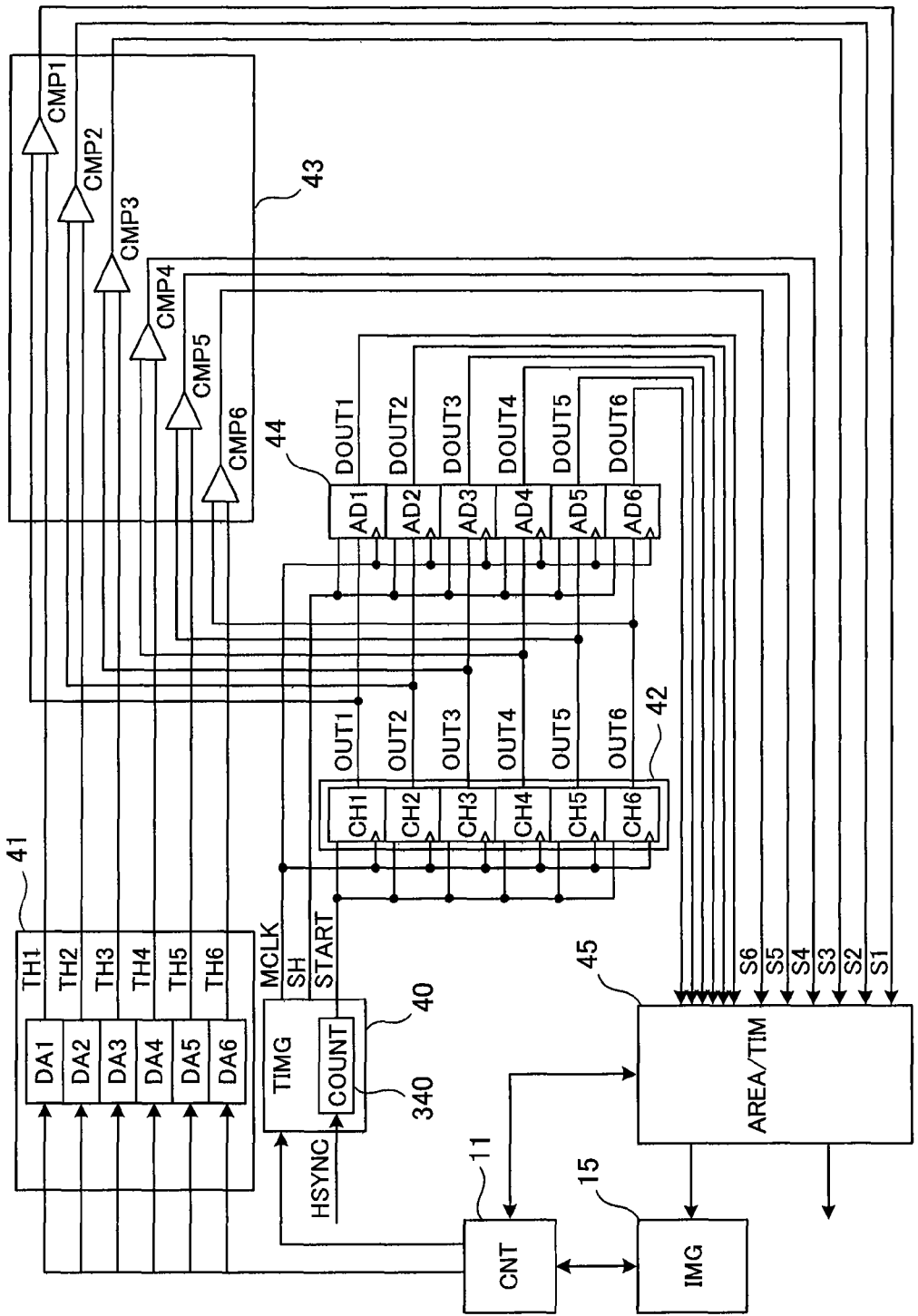
FIG. 5 is a diagram illustrating an example of the configuration of a circuit including the sensor unit according to the exemplary embodiment.

FIG. 5 is a diagram mainly illustrating the circuit configuration of the sensor unit 1. In the following description, the main control unit 11 is referred to as CNT 11, the image processing unit 15 is referred to as IMG 15, and the timing generation circuit 40 is referred to as TIMG 40. The D/A conversion circuit 41 is referred to as a DA converter 41 and converters of the D/A conversion circuit 41 are referred to as DA 1 to DA 6. The digitalization circuit 43 is referred to as a comparator 43 and comparison circuits of the digitalization circuit 43 are referred to as CMP 1 to CMP 6. The A/D conversion circuit 44 is referred to as an AD converter 44 and converters of the A/D conversion circuit 44 are referred to as AD 1 to AD 6. The region and timing circuit 45 is referred to as AREA/TIM 45.

The CNT 11 sets a threshold voltage (digital value) for the DA converter 41. In this exemplary embodiment, the DA converter 41 includes six converters DA1 to DA6 and a threshold value can be set for individual converter. The DA converter 41 outputs analog voltages TH1 to TH6 based on the threshold voltage instructed by the CNT 11.

The outputs TH1 to TH6 of the DA converter 41 are input as signals of the respective threshold voltages into input terminals of the CMP 1 to CMP 6 of the comparator 43. On the other hand, the other input terminals of the CMP 1 to CMP 6 are connected to output terminals of the CH 1 to CH 6 of the sensor array 42 and input outputs (analog voltages) of the CH 1 to CH 6. That is, the reading signals output from the sensor array 42 are digitalized to HIGH or LOW by the comparator 43 based on the threshold signals instructed from the CNT 11.

The comparator 43 outputs digitalized signals S1 to S6 which become HIGH when reading signals OUT1 to OUT6 exceed the threshold signals TH1 to TH6 and become LOW when the reading signals OUT1 to OUT6 are less than the threshold signals TH1 to TH6. As apparent from FIG. 5, numerals given to the reading signals OUT1 to OUT6, the threshold signals TH1 to TH6, and the digitalized signals S1 to S6 correspond to the CH numbers of the sensor array 42.

The digitalized signals S1 to S6 from the comparator 43 are individually output to the AREA/TIM 45. The AREA/TIM 45 receives one of the outputs S1 to S6 to detect whether there is a sheet. The AREA/TIM 45 outputs signals for execution timings based on the signals S1 to S6 to the external units of the sensor unit 1.

On the other hand, the TIMG 40 generates a conversion clock MCLK serving as a reference clock of the sensor unit 1 based on an instruction of the CNT 11. A COUNT 340 which is a counter included in the TIMG 40 measures a horizontal synchronization HSYNC and generates a conversion start signal (START signal) of the sensor array 42. The sensor array 42 starts the reading operation based on the START signal and outputs the sensor output (analog voltage) read in synchronization with the conversion clock.

The TIMG 40 generates a sample and hold signal SH serving as a timing signal with which the output of the sensor array 42 is subjected to AD conversion. The sensor output is subjected to a sample and hold operation until the timing at which each sensor output becomes stable by the SH signal. The sensor outputs of the CH 1 to CH 6 subjected to the sample and hold operation are input to input terminals of the AD 1 to AD 6 of the AD converter 44, are subjected to AD conversion, and are output as digital signals DOUT1 to DOUT6 after a pipeline delay time elapses.

The outputs DOUT1 to DOUT6 subjected to the AD conversion by the AD converter 44 are input as the reading signals to the AREA/TIM 45. The AREA/TIM 45 converts the input signals DOUT1 to DOUT6 and transmits signals of the converters as pixel values on the sheet to the IMG 15.

The sensor unit 1 has an output path from the sensor array 42 to the comparator 43 and an output path from the comparator 43 to the AREA/TIM 45, as described above, as well as an output path from the sensor array 42 to the AD converter 44 and an output path from the AD converter 44 to the AREA/TIM 45. The comparator 43 compares the threshold signals TH1 to TH6 to the reading signals OUT1 to OUT6 of the sensor array 42 for each channel and outputs the digitalized HIGH or LOW signals S1 to S6 to the AREA/TIM 45 for each channel. With such a circuit configuration, the AREA/TIM 45 can receive a detection signal of sheet passage via no AD converter 44. Accordingly, the signal of the executing timing can be output to the outside more instantly without receiving the influence of the delay occurring due to the AD conversion.

The reading signals OUT1 to OUT6 from the sensor array 42 are analog signals indicating gray scales. Accordingly, since the AD converter 44 converts the gray scales into digital gray scale values and outputs the digital gray scale values, the delay occurs in the processing. On the other hand, since the comparator 43 just compares whether the reading signal output from the sensor array 42 exceeds the threshold value, the digitalized signals S1 to S6 can be output at higher speed.

Figure 6:
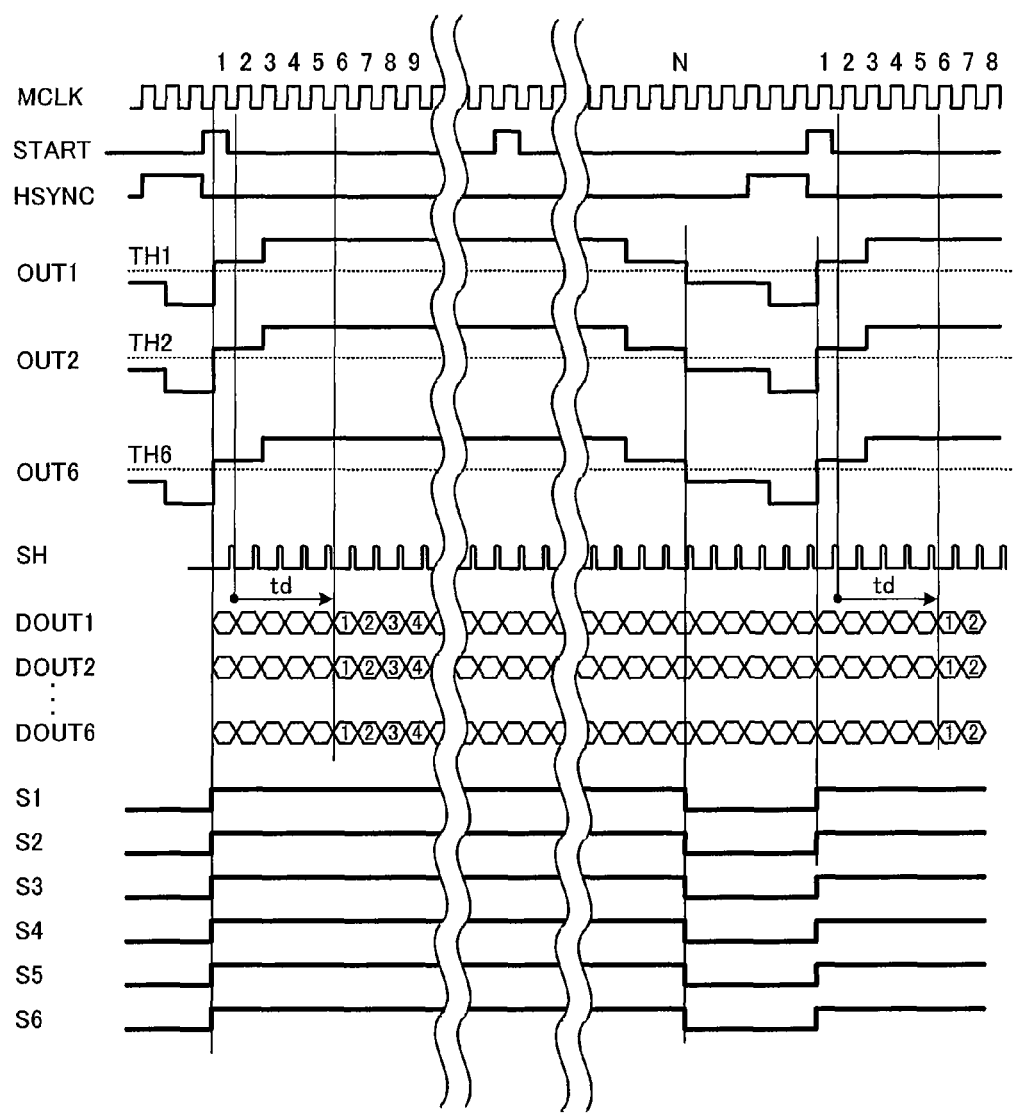
FIG. 6 is a diagram illustrating an example of a timing chart of signals output from respective circuits of the sensor unit.

Next, an example of the timing chart of each signal is shown in FIG. 6.

The sheet starts to be transported after a skewing of the sheet is corrected by the aligning roller. An HSYNC signal is output in synchronization with this timing. The HSYNC signal is output at each period in which the sheet is transported by the resolution. For example, when the resolution is 600 dpi, the HSYNC signal is output at a time interval at which the paper is transported by 25.4 [m]/600 [dpi] (about 42.3 μm).

The horizontal synchronization is counted by the COUNT 340 included in the TIMG 40 and the START signal is output after the HSYNC signal is counted by a predetermined number. In this exemplary embodiment, the START signal is output every count of six HSYNC signals. The count number is determined depending on the transport speed of the sheet and the conversion speed of the sensor unit 1. In this exemplary embodiment, this count number is used since the conversion speed in the sensor unit 1 is slower than the sheet transport speed and it takes a considerable time corresponding to six HSYNC signals to end the reading and conversion of all the sensors.

The START signal is output and the first sensors of respective CHs of the sensor array 42 output the sensor outputs OUT1 to OUT6 from the first clock after a rise of the START signal. In FIG. 6, the sheet is illustrated from the timing at which the front end of the sheet reliably starts passing through a sensor region.

The sensor outputs OUT1 to OUT6 are compared to the threshold voltages TH1 to TH6 by the comparator 43. The comparator 43 outputs the signals S1 to S6 of the HIGH level when the signals OUT1 to OUT6 are higher than the threshold voltages TH1 to TH6, respectively. For example, in regard to CH1, the comparator 43 outputs the signal S1 of the HIGH level when the sensor output OUT1 is higher than the threshold voltage TH1, whereas outputting the signal S1 of the LOW level when the sensor output OUT1 is lower than the threshold voltage TH1. The same is applied to the outputs of the other channels.

In the related art, the front end of the sheet is detected using the outputs DOUT1 to DOUT6 of the AD converter 44. The signals DOUT1 to DOUT6 are output after the delay (td time in FIG. 6) caused due to the AD conversion elapses (in FIG. 6, data indicated by numerals 1 to 4 or the like are actual data). However, by the above method, the front end of the sheet can be detected without occurrence of the delay caused due to the AD conversion.

When a state where the sensor outputs OUT1 to OUT6 exceed the threshold voltages TH1 to TH6 is transitioned to a state where the sensor outputs OUT1 to OUT6 are less than the threshold voltages TH1 to TH6, this portion becomes the rear end of the sheet (a portion where one of the digitalized signals S1 to S6 is transitioned from HIGH to LOW becomes the rear end of the sheet and corresponds to the N-th clock of an MCLK signal in FIG. 6). When the digitalized signal output from the comparator 43 is transitioned from LOW to HIGH, the AREA/TIM 45 transmits a signal such as a control start signal or an execution timing signal or a predetermined value (herein referred to as a first value) to the external unit of the sensor unit 1. Further, when the digitalized signal is transitioned from HIGH to LOW, the AREA/TIM 45 transmits a signal such as a control end signal or a predetermined value (second value) different from the first value to the external unit of the sensor unit 1.

The above-described operation is reiterated in accordance with the reference clock.

In the timing chart shown in FIG. 6, the reason for transitioning the sensor outputs OUT1 to OUT6 to a high voltage from the third clock is that the sheet completely enters the detection region of the sensor unit 1.

In this exemplary embodiment, the sheet has been recorded as an object to be detected, but other media may be used. Further, the example has been described in which the medium transport unit and the sensor unit according to the exemplary embodiment are applied to the image forming apparatus. However, for example, the medium transport unit and the sensor unit may be applied to a substrate transport unit, a substrate detection unit, or the like according to another technique.

As described in detail above, according to the technique described in the exemplary embodiment, it is possible to accurately detect the front end or the rear end of a medium without a delay time caused due to the A/D conversion.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A medium transport unit comprising:
a transport roller;
a transport belt which transports a loaded medium by driving of the transport roller;
a sensor array which includes a plurality of imaging elements arranged vertically to a transport direction of the medium and outputs a reading signal which is detected and output by each of the plurality of imaging elements and indicate a density value of the medium on the transport belt;
a comparator which receives the reading signal output from the sensor array and outputs a digitalized signal of HIGH if the reading signal exceeds an input threshold signal; and
a signal output circuit which receives the digitalized signal output from the comparator and outputs a first value if the digitalized signal is transitioned from LOW to HIGH.

2. The unit according to claim 1,
wherein the reading signal is an analog signal,
wherein the unit further comprises an AD conversion circuit which receives the reading signal, converts the reading signal into a digital signal, and outputs the digital signal, and
wherein the signal output circuit receives the output signal from the AD conversion circuit and outputs a converted reading value as a pixel value of the sheet.

3. The unit according to claim 1, further comprising:
a DA conversion circuit which receives a digital signal output from a controller and indicating a threshold value, converts the digital signal into an analog signal, and outputs the analog signal,
wherein the comparator receives a threshold signal output from the DA conversion circuit.

4. The unit according to claim 1,
wherein the sensor array is additionally divided into a plurality of groups, the plurality of groups include a single or a plurality of imaging elements, and each of the groups is operated to output the reading signal, and
wherein the comparator includes a plurality of comparison circuits, and each of the comparison circuits receives the reading signal output from the corresponding group and outputs a digitalized signal of the corresponding group.

5. The unit according to claim 4, further comprising:
an AD conversion circuit which receives the reading signal output from each group for each group, converts the reading signal into a digital signal, and outputs the digital signal for each group to the signal output circuit.

6. The unit according to claim 4,
wherein each of the comparison circuits of the comparator receives a threshold signal corresponding to each group and compares the threshold signal for each group to the reading signal.

7. The unit according to claim 4,
wherein the groups are configured so as to include the same number of imaging elements.

8. The unit according to claim 1,
wherein the comparator makes the digitalized signal LOW and outputs the digitalized signal if the reading signal is less than the threshold signal, and
wherein the signal output circuit outputs a second value different from the first value, if the digitalized signal is transitioned from HIGH to LOW.

9. The unit according to claim 1,
wherein the medium transport unit is included in an image forming apparatus and the medium is a sheet.

10. A sensor unit comprising:
a sensor array which includes a plurality of imaging elements arranged vertically to a transport direction of a medium and outputs a reading signal which is detected and output by each of the plurality of imaging elements and indicate a density value of the medium being transported;
a comparator which receives the reading signal output from the sensor array and outputs a digitalized signal of HIGH if the reading signal exceeds an input threshold signal; and
a signal output circuit which receives the digitalized signal output from the comparator and outputs a first value if the digitalized signal is transitioned from LOW to HIGH.

11. The unit according to claim 10,
wherein the reading signal is an analog signal,
wherein the unit further comprises an AD conversion circuit which receives the reading signal, converts the reading signal into a digital signal, and outputs the digital signal, and
wherein the signal output circuit receives the output signal from the AD conversion circuit and outputs a converted reading value as a pixel value of the sheet.

12. The unit according to claim 10, further comprising:
a DA conversion circuit which receives a digital signal output from a controller and indicating a threshold value, converts the digital signal into an analog signal, and outputs the analog signal,
wherein the comparator receives a threshold signal output from the DA conversion circuit.

13. The unit according to claim 10,
wherein the sensor array is additionally divided into a plurality of groups, the plurality of groups include a single or a plurality of imaging elements, and each of the groups is operated to output the reading signal, and
wherein the comparator includes a plurality of comparison circuits, and each of the comparison circuits receives the reading signal output from the corresponding group and outputs a digitalized signal of the corresponding group.

14. The unit according to claim 13, further comprising:
an AD conversion circuit which receives the reading signal output from each group for each group, converts the reading signal into a digital signal, and outputs the digital signal for each group to the signal output circuit.

15. The unit according to claim 13,
wherein each of the comparison circuits of the comparator receives a threshold signal corresponding to each group and compares the threshold signal for each group to the reading signal.

16. The unit according to claim 10,
wherein the comparator makes the digitalized signal LOW and outputs the digitalized signal if the reading signal is less than the threshold signal, and
wherein the signal output circuit outputs a second value different from the first value, if the digitalized signal is transitioned from HIGH to LOW.

17. A method of controlling reading of a medium transport unit comprising:
acquiring reading signals which are detected by a plurality of imaging elements arranged vertically to a transport direction of a medium and indicate a density value of the medium being transported; and
outputting a first value if the reading signal exceeds an input threshold signal.

18. The method according to claim 17,
wherein the reading signal is an analog signal,
wherein the medium transport unit receives the reading signal, converts the reading signal into a digital signal, and outputs a converted reading value as a density value of a sheet.

19. The method according to claim 17,
wherein the medium transport unit outputs a second value different from the first value, if the reading signal is less than the threshold signal.

20. The method according to claim 17,
wherein the medium transport unit is included in an image forming apparatus and the medium is a sheet.

* * * * *